(12) United States Patent
Bergeron et al.

(10) Patent No.: US 10,421,601 B2
(45) Date of Patent: Sep. 24, 2019

(54) PROCESSOR TRAY AND METHOD OF PACKING

(71) Applicant: Tekni-Plex, Inc., Wayne, PA (US)

(72) Inventors: Mark A. Bergeron, Monroe, GA (US); Babu Kuruvilla, Griffin, GA (US)

(73) Assignee: Tekni-Plex, Inc., Wayne, PA (US)

( * ) Notice: Subject to any disclaimer, the term of this patent is extended or adjusted under 35 U.S.C. 154(b) by 212 days.

(21) Appl. No.: 15/417,520

(22) Filed: Jan. 27, 2017

(65) Prior Publication Data
US 2018/0215529 A1   Aug. 2, 2018

(51) Int. Cl.
*B65D 85/08* (2006.01)
*B65B 25/06* (2006.01)
(Continued)

(52) U.S. Cl.
CPC .............. *B65D 85/08* (2013.01); *A23P 30/00* (2016.08); *B65B 19/34* (2013.01); *B65B 25/065* (2013.01);
(Continued)

(58) Field of Classification Search
CPC .......... B65D 85/08; B65D 25/10; B65D 1/36; B65D 21/0233; B65D 25/103; B65D 85/72; B65B 25/065; B65B 19/34; A23P 30/00
See application file for complete search history.

(56) References Cited

U.S. PATENT DOCUMENTS

| 1,351,285 A | 8/1920 | Chess |
| 2,918,379 A | 12/1959 | Lurie |

(Continued)

FOREIGN PATENT DOCUMENTS

| CA | 1232241 A | * | 2/1988 | ............... B65D 1/36 |
| CN | 201082800 Y | * | 7/2008 | ............... B65D 1/36 |

(Continued)

OTHER PUBLICATIONS

"Dolco develops new processor trays for meat and poultry product", available Dec. 8, 2017, [online], [site visited Dec. 18, 2017]. Available from internet, <URL: http://foodproducts.packaging-business-review.com/news/dolco-develops-new-processor-trays-for-meat-and-poultry-products-081217-5997662 (Year: 2017).

(Continued)

*Primary Examiner* — Viren A Thakur
(74) *Attorney, Agent, or Firm* — Polsinelli PC (57) ABSTRACT

Processor tray for displaying tubular meat products in an arcuate configuration, and designed to help guide the packer to mold and place curved meat products in the tray. The filled tray is wrapped in film, and the configuration of the filled tray maintains the film taut to avoid leakage. The tray includes a rectangular upper shaped cavity, and a plurality of curved recessed pockets extend below the upper cavity to define a lower cavity. The tray is designed to provide structural rigidity that resists warping and breakage, thus enabling the overwrapped tray to be handled, shipped, and displayed with minimal leakage or breakage. In some embodiments the tray includes features that facilitate de-nesting of a stack of empty trays, and is adapted to facilitate movement of the wrapped package on a moving conveyor line. The tray is easy to manufacture and provides a lightweight and cost effective packaging product. Preferably the tray has a rectangular shape that provides for consistent wrapping strength and can be handled on standard processing equipment.

17 Claims, 8 Drawing Sheets

(51) Int. Cl.
    *B65D 25/10*     (2006.01)
    *B65D 21/02*     (2006.01)
    *B65D 1/36*     (2006.01)
    *B65B 19/34*     (2006.01)
    *A23P 30/00*     (2016.01)
    *B65D 85/72*     (2006.01)

(52) U.S. Cl.
    CPC ........... *B65D 1/36* (2013.01); *B65D 21/0233* (2013.01); *B65D 25/10* (2013.01); *B65D 25/103* (2013.01); *B65D 85/72* (2013.01)

(56) References Cited

U.S. PATENT DOCUMENTS

| | | |
|---|---|---|
| 3,264,120 A | 8/1966 | Westcott |
| 4,057,651 A * | 11/1977 | Florian .................... B65D 1/34 229/407 |
| D272,505 S | 2/1984 | Daenen |
| D274,693 S | 7/1984 | Cruz |
| D293,193 S | 12/1987 | Vandervoort |
| 5,018,623 A | 5/1991 | Hrenyo |
| D353,302 S | 12/1994 | Fish |
| D353,765 S * | 12/1994 | Kocis .................. B65D 75/327 D9/761 |
| D354,197 S | 1/1995 | Fish |
| 5,394,986 A | 3/1995 | Oya |
| 5,558,222 A * | 9/1996 | Volk .................. B65D 21/0233 206/338 |
| D374,151 S | 10/1996 | Malvasio |
| D378,561 S | 3/1997 | Ferris |
| D378,895 S | 4/1997 | Bankier |
| 5,770,249 A | 6/1998 | Mello |
| 5,820,904 A * | 10/1998 | Mello .................. B65D 75/327 426/119 |
| 5,934,472 A | 8/1999 | Ramirez et al. |
| D451,347 S | 12/2001 | Kleckauskas |
| D480,736 S | 10/2003 | Wright |
| D485,725 S | 1/2004 | Real |
| D487,971 S | 4/2004 | Bergeron |
| D516,914 S | 3/2006 | Ducharme |
| D523,751 S | 6/2006 | Vetrano |
| D569,196 S | 5/2008 | Angel |
| D586,056 S | 2/2009 | Shea |
| D633,754 S | 3/2011 | Benson |
| D656,821 S | 4/2012 | Marcoux |
| D751,291 S | 3/2016 | MacNeil |
| 2005/0040068 A1* | 2/2005 | Palder ...................... B65D 1/22 206/499 |
| 2010/0230322 A1* | 9/2010 | Nicholson ................ B65D 1/34 206/560 |
| 2011/0048250 A1 | 3/2011 | Liu |
| 2011/0139660 A1* | 6/2011 | Cabell ................... B29C 51/162 206/459.5 |
| 2013/0292393 A1* | 11/2013 | Doherty ................... B65D 1/36 220/608 |
| 2014/0335240 A1* | 11/2014 | Field ....................... B65B 25/06 426/129 |
| 2015/0181898 A1* | 7/2015 | Tamaki .................. A21D 15/02 426/95 |

FOREIGN PATENT DOCUMENTS

| | | | | |
|---|---|---|---|---|
| DE | 202009018478 U1 * | 10/2011 | ............ | B65D 1/36 |
| EP | 1779733 A1 * | 5/2007 | .......... | A22C 11/001 |
| EP | 2915758 A1 * | 9/2015 | ............ | B65D 1/36 |
| JP | 11056313 A * | 3/1999 | .......... | A22C 11/001 |
| WO | WO-2016199882 A1 * | 12/2016 | ............ | A21D 13/31 |

OTHER PUBLICATIONS

Tekni-Films, available Jan. 17, 2017, [online], [site visited Dec. 18, 2017]. Available from internet, <URL: https://www.medicalplasticsnews.com/news/tekni-films-discussing-its-latest-rigid-and-flexible-packagi/ (Year: 2017).

NZFRESH Sausage Tray, available Dec. 18, 2017, [online], [site visited Dec. 18, 2017]. Available from internet, <URL: http://www.nzfresh.net/new-product-1/(Year: 2017).

* cited by examiner

PROCESSOR TRAY AND METHOD OF PACKING

FIELD OF THE INVENTION

The invention relates to plastic foam packaging and, more particularly, to processor trays for packaging tubular meat products in an arcuate configuration.

BACKGROUND OF THE INVENTION

Various plastic foam processor trays for packaging food are known in the prior art. In designing a processor tray, inner surface area, capacity, sidewall rigidity, and weight are key considerations. These trays are typically packed with perishable food items and then surrounded with a plastic film overwrap to seal the food within the package. Once wrapped the tray is ready to be placed in a container for shipment; typically, multiple wrapped processor trays are stacked one upon another and the weight of the packaged processor trays may cause the plastic film of underlying trays to be stretched and loosened during shipment. As a result the wrapped trays may leak juices, blood, etc. from the products packaged therein, leading to a loss of aesthetic appeal, loss of shelf life, contamination of adjacent packages, and difficulty in handling.

Another consideration for the packaging of tubular meat products, such as sausages, is the desire to present the sausage in an arcuate (curved) configuration as it is generally considered more pleasing. The sausages however are made in straight (linear) form and must be shaped from linear to the desired curved configuration either manually or by mechanical means. It is difficult to place curved sausages in a tray, and in particular to maintain the curved configuration of the sausages in the tray.

One prior art solution is to form a tray with a series of curved recesses, each recess being suitably sized to receive substantially the entire length and depth (radial diameter) of the sausage, and to provide an overhanging edge in the opening of the recess to hold the (entire) sausage in its respective recess (Mello U.S. Pat. No. 5,820,904). The Mello tray is not only structurally deficient but very difficult to form with any standard thermoforming processing equipment as the overhang makes it difficult or impossible to remove the tray from the mold. The overhang also makes it hard to get the sausage into the tray recess.

Another proposed solution is to form a flat bottom tray having a series of recesses in the sidewalls to engage the rounded ends of the curved sausage links (Benson U.S. Design Pat. D633,754S). The Benson tray is not particularly effective in holding the sausages in place in the wrapped package, as the wrapped packages are often turned upside down, and encounter rough handling during shipment. Another disadvantage of the Benson sausage tray is that one end is convex and the other concave which leads to challenges in wrapping, de-nesting, and results in poor yield from the production aspect (e.g., as the product is trimmed in the manufacturing area it generates more scrap). The Benson tray also requires using the edge of one sausage product to hold the next sausage product in place, leading to manual distortion of the products.

Thus it would be desirable to provide a processor tray which can maintain tubular meat products in an arcuate configuration during packing, shipment and display.

It would be desirable to provide such a tray that can maintain a plastic film wrapped there about in a taut state.

It would be desirable to provide such a processor tray having substantial structural rigidity.

It would be desirable to provide such a processor tray that is easy and inexpensive to manufacture, easy to load (fill with product), and easy to stack and un-stack (de-nest) both empty and filled.

SUMMARY OF THE INVENTION

A processor tray is provided according to the invention adapted to display tubular meat products in an arcuate configuration, and designed to help guide the packer to mold and place the meat products in the tray. The tray is designed to hold the tubular meat products in an arcuate configuration prior to being wrapped, and also to hold the meat products in position while being wrapped. The tray is designed to provide structural rigidity that resists warping and breakage, thus enabling the overwrapped tray to be handled, shipped, and displayed with minimal leakage or breakage. In some embodiments the tray includes features that facilitate de-nesting of a stack of empty trays, and is adapted to facilitate movement of the wrapped package on a moving conveyor line. The tray is easy to manufacture and provides a light-weight and cost effective packaging product. Preferably the tray has a rectangular shape that provides for consistent wrapping strength and can be handled on standard processing equipment.

In one embodiment, a molded plastic overwrap tray is provided for displaying each of a plurality of elongated tubular meat products, that normally maintain a substantially straight shape, in a curved configuration in the tray, the tray comprising:

an integrally formed plastic foam tray having a base cavity and an upper cavity;

the upper cavity forming an open top end of the tray and comprising opposing first and second elongated sidewalls and opposing first and second end walls, the sidewalls and end walls being a connected by rounded corners to form a rectangular shaped upper cavity;

a plurality of curved recessed pockets extending below the upper cavity to define the base cavity, each pocket having an elongated curved configuration adapted to receive a normally straight elongated tubular meat product after it has been bent in the curved configuration of the pocket, wherein a lower portion of the tubular meat product is disposed in the curved pocket and an upper portion of the tubular meat product lies in the upper cavity;

a rectangular shaped flange disposed at an upper end of the sidewalls, end walls and corners forming the open top end of the tray for wrapping an overwrap film around the tray and curved elongated tubular meat products.

In one embodiment, the pockets are aligned in series between the first and second sidewalls of the tray, and the tray includes a central pusher wall in the upper cavity that extends from the first end wall and a ramp surface that extends into a first one of the pockets adjacent the first end wall.

In one embodiment, the tray includes two corner pusher walls in the upper cavity disposed respectively adjacent one of the two corners connecting the second end wall to the first and second sidewalls, each corner pusher wall lying between a second one of the pockets disposed adjacent the second end wall, and the respective corner.

In one embodiment, each pocket includes opposing first and second elongated curved sidewalls extending between the opposing first and second sidewalls of the tray, and opposing first and second rounded pocket end walls disposed adjacent the opposing first and second end walls of the tray, the rounded pocket end walls being configured to each receive an opposing rounded end of the curved tubular meat product.

In one embodiment, a method of packing elongated tubular meat products in a packing tray for display and storage is provided, the method comprising:

providing a plurality of straight elongated tubular sausage products;

providing a tray having a perimeter defining a top reference plane TRP and an upper cavity recessed below the TRP, the tray having a longitudinal axis parallel to the TRP and a plurality of curved pockets recessed below the upper cavity, each curved pocket having a longitudinal arc shape aligned along the longitudinal axis of the tray;

depositing each meat product into a respective pocket by shaping the meat product to conform to the longitudinal arc shape of the pocket, a lower portion of the meat product being deposited in the pocket and an upper portion of the meat product extending into the upper cavity and at or above the TRP;

providing a sheet of wrapping film and positioning it over the tray and the sausage product deposited therein;

pulling the sheet taut to engage the surface of each meat product deposited within the tray and the tray perimeter; and securing the sheet to the tray.

In one embodiment, a packing tray for elongated tubular meat products is provided, the packing tray comprising:

a plastic foam tray having topside and underside surfaces, the underside surface including a lowermost standing surface of the tray;

the tray having a rectangular perimeter defining a top reference plane TRP, the perimeter comprising opposing first and second longitudinal edges aligned parallel to a central longitudinal tray axis CL and opposing first and second lateral edges transverse to the CL;

the tray topside surface having a cavity wall depending downwardly from the perimeter to define an upper interior cavity, and the tray topside surface further including a plurality of longitudinally aligned curved pockets recessed below the cavity wall; and each curved pocket having elongated arc shaped opposing sidewalls configured to shape an elongated tubular meat product into an arced configuration in the pocket.

In one embodiment, the tray topside surface further includes:

a trim forming the perimeter of the tray, the trim having a top surface coextensive with the TRP and including a trim underside and opposed interior and exterior edges;

the exterior edge being coextensive with the perimeter; and the trim underside comprising a portion of the tray underside surface.

In another embodiment of the invention, the trim further includes:

a bead disposed below the trim on the underside surface of the tray and configured to separate the trim underside of a first outer nested tray from the trim of an inner nested second tray.

In one embodiment, each elongated arc shaped sidewall has an apex located halfway along the length of the pocket.

In one embodiment, the apex is located on the CL.

In one embodiment, the tray topside surface further includes:

a first end pocket proximally disposed toward the first lateral edge and longitudinally aligned, the first end pocket recessed below the cavity wall;

the first end pocket comprising a first side wall and an opposed center pusher wall, the first side wall and the center pusher wall each having a respective arc length;

the center pusher wall proximally disposed toward the first lateral edge, and the arc length of the center pusher wall being less than the arc length of the first side wall;

wherein, when a tubular sausage product having a length that includes a midsection, is disposed in the first end pocket, the center pusher wall pushes against the sausage midsection and the first side wall pushes against the length of the sausage.

In one embodiment, the tray topside surface further comprises:

a center pusher plateau disposed between the center pusher wall and the cavity wall, and the center pusher plateau having opposed first and second lateral edges aligned transverse to the center pusher wall;

the center pusher plateau comprising a peripheral surface recessed below the cavity wall and above the center pusher wall, the peripheral surface aligned parallel to the TRP and connecting the center pusher wall to the cavity wall;

opposed first and second center pusher sidewalls depending downwardly from the first and second center pusher plateau lateral edges;

wherein the first and second center pusher sidewalls connect respective edges of the center pusher wall to the cavity wall.

In one embodiment, the cavity wall depends downwardly from the TRP at an acute angle.

In one embodiment, each pocket further comprises opposed quarter-spherical first and second ends adjacent the cavity wall.

In one embodiment, the tray further includes:

a formed flat area comprising a planar surface aligned parallel to the TRP, the surface comprising a portion of the tray underside surface;

the formed flat area recessed below the lowermost standing surface of the tray;

a plurality of longitudinally aligned recessed nesting segments dividing consecutive pockets, the recessed nesting segments comprising a portion of the tray topside surface;

wherein the nesting segments of a first tray are configured to accommodate the formed flat area of a second tray nested within the first tray.

In on embodiment of the invention, the stack comprises:

a first tray and one or more nested trays;

a second tray nested within the first tray;

wherein the topside surface of the first tray engages the underside surface of the second tray, and each remaining tray in the stack likewise engaged a preceding tray.

In one embodiment, the trim exterior edge forms a substantially rectangular perimeter.

In one embodiment, the plastic material comprises one or more of polystyrene (EPS), polyester, polyolefin, polypropylene (PP), or polylactic acid (PLA), including homopolymers, copolymers, mixtures and blends thereof, and including virgin and reclaimed (recycled) materials, and whether solid or foamed.

In one embodiment, the plastic foam tray comprises polystyrene foam.

In one embodiment, each pocket has a depth extending below the upper cavity of 15 to 50% of the diameter PD of the meat product.

In one embodiment, the tray depth is 30 to 45%.

In one embodiment, the tray depth is 40 to 45%.

In one embodiment, each opposing pocket sidewall is defined by an arc comprising an angle between two intersecting straight lines L1, L2 that pass respectively through centers C1, C2 of the opposing rounded ends of the arced pocket and cross at CL, and wherein the angle ranges from 5 to 50 degrees.

In one embodiment, the angle ranges from 10 to 30 degrees.

In one embodiment, the angle ranges from 10 to 20 degrees.

These and other features of the invention will be better understood from the following detailed description and accompanying drawings.

DETAILED DESCRIPTION OF THE INVENTION

Referring generally to FIGS. 1-6, a first embodiment of a processor tray of the invention is depicted therein and generally designated with the numeral 10. FIGS. 8-11 show the same tray 10 loaded with five curved sausages. FIGS. 9 and 11 show the loaded tray 10 with a plastic film wrap F surrounding the tray and sausages.

The tray 10 is formed of a plastic foam material, such as foam polystyrene or expanded polystyrene. The tray includes a base 12, and extending upwardly from the base, a pair of opposing longitudinal sidewalls 14, 16, a pair of opposing end walls 18, 20 and corners 22-28 joining the sidewalls and end walls. Additionally, the tray 10 may be lined or coated with barrier film. A top flange (trim) 30 lying in a top reference plane TRP extends from the uppermost portions of the sidewalls 14, 16, end walls 18, 20, and corners 22-28. In this embodiment, the TRP lies parallel to a base reference plane (BRP) on which the undersurface (or back) of the tray rests. The embodiment shown is formed from molding procedures which utilize matched mating male and female dies. The inner and outer surfaces of the elements of the tray are shown to be generally parallel. The tray however may be formed with various portions which do not have parallel inner and outer surfaces.

Figure 1:
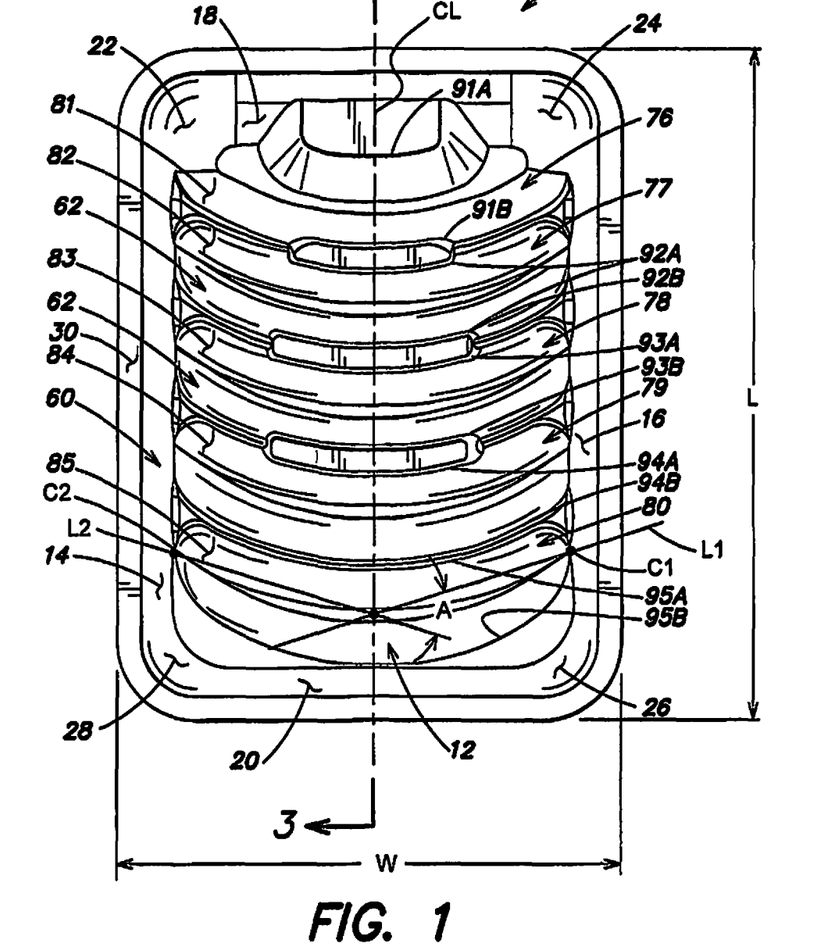
FIG. 1 is a top plan view of an empty tray according to a first embodiment of the invention.

The tray 10 is shown in the Figs. to have a generally rectangular shape, with longitudinal sidewalls 14, 16 being longer in length L than the width W of end walls 18, 20 (FIG. 1). The tray 10, however, can be formed with sidewalls and end walls having equal length to have a generally square appearance. It is desirable that the sidewalls and end walls have a straight (linear) flange for improved wrapping capability, while the flange at the corners is rounded to avoid undue stress on the wrapping film.

In forming the tray 10 it is preferred that the tray 10 be unitarily formed from a single sheet of plastic foam material molded to define the features described herein. In this embodiment the thickness of the tray is substantially equal throughout. However, during manufacturing the foam material will compress differently at various locations, resulting in some thickness variations in the tray 10 (see for example the thickness variations in the base 12 shown in FIG. 3).

Figure 3:
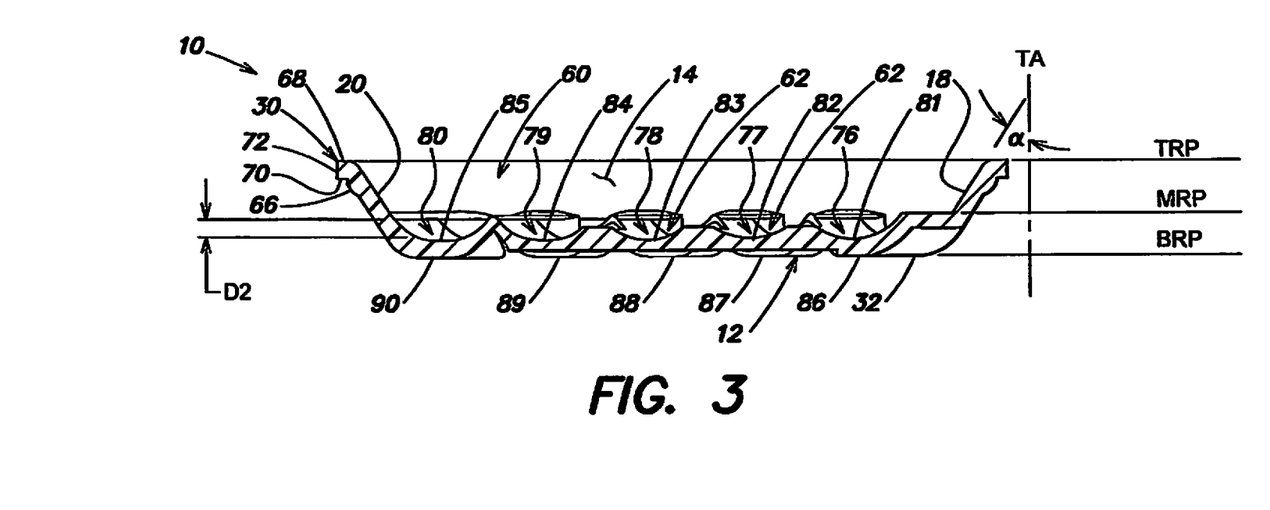
FIG. 3 is a side cross-sectional view of the tray taken along line 3-3 of FIG. 1.
Figure 6:
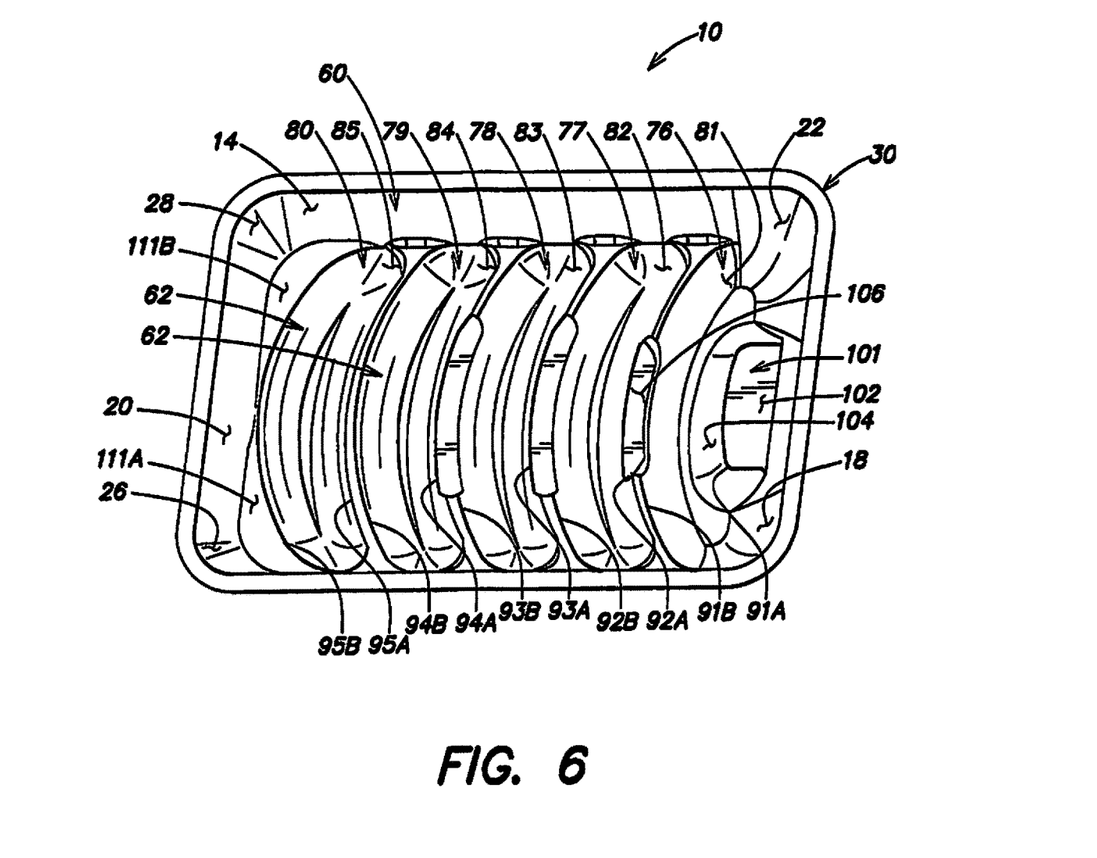
FIG. 6 is a top perspective view of the tray of FIG. 1.
Figure 8:
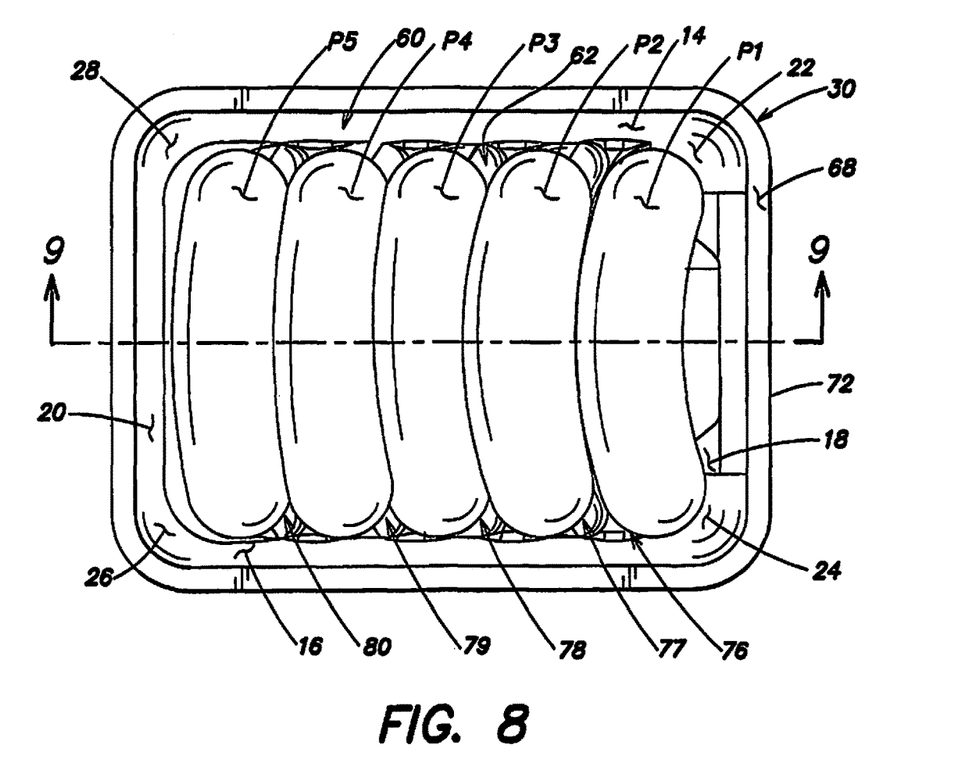
FIG. 8 is a top plan view of the tray of FIG. 1 with sausages loaded in the tray.
Figure 9:
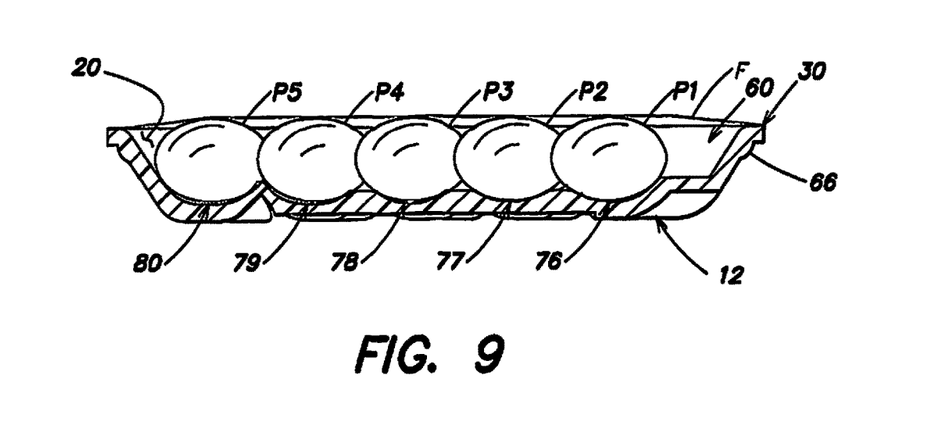
FIG. 9 is a side cross-sectional view of the loaded tray of FIG. 8 with plastic film wrapped around the tray.

As best shown in FIGS. 3 and 6, the tray includes an upper interior cavity 60 defined by the inner surfaces of the sidewalls, end walls and corners, and a lower interior base cavity 62 defined by the inner surfaces of a series of five recessed pockets 76-80 each configured to hold a tubular meat product P1-P5 in an arcuate configuration (see FIGS. 8-11 showing the loaded tray). Each meat product is held in place in one of the pockets 76-80, but extends above the pocket into the upper interior cavity 60 as shown in FIGS. 8-9. The product may be placed into the pockets either manually or by appropriate mechanical means. The arc A of the desired curvature (see FIG. 1) is defined as the angle between two intersecting straight lines L1, L2 that pass respectively through centers C1, C2 of the opposing rounded ends of the arced pocket and cross at the longitudinal centerline CL of the tray. The degree of arc can vary with the type of products, its dimensions, and the dimensions of the tray, but preferably lies within a range of 5 degrees to 50 degrees, more preferably 10 to 30 degrees, and in the present embodiment the arc is about 15 degrees.

Figure 5:
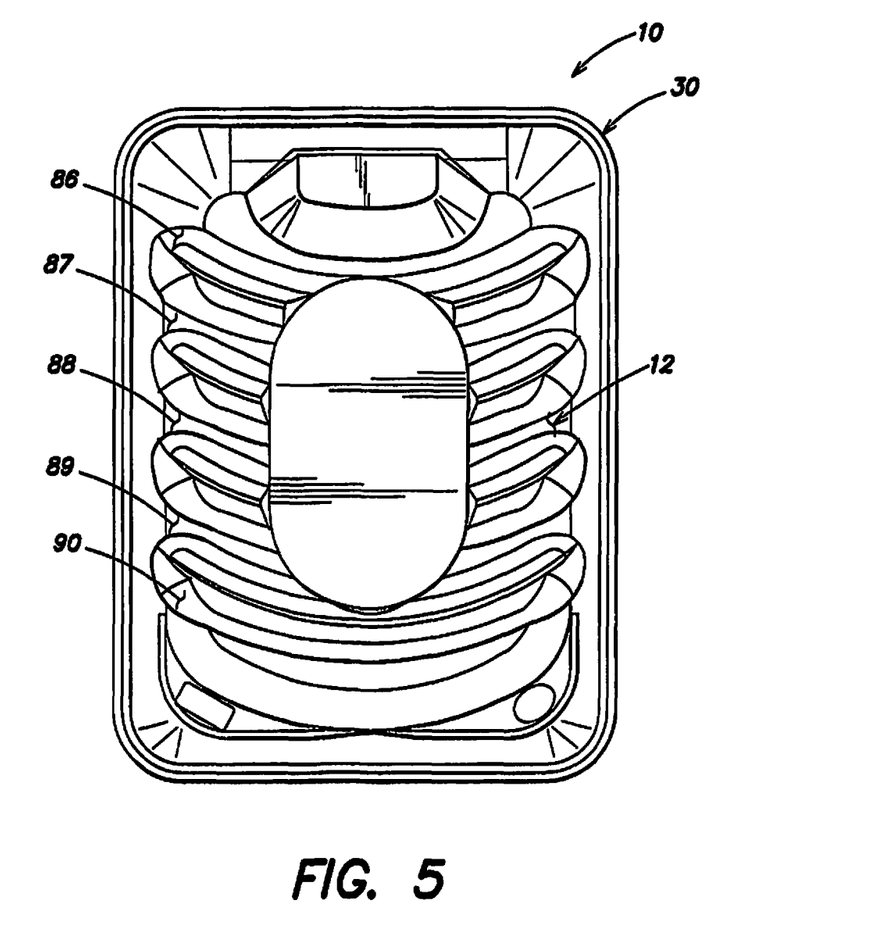
FIG. 5 is a bottom plan view of the tray of FIG. 1.
Figure 7:
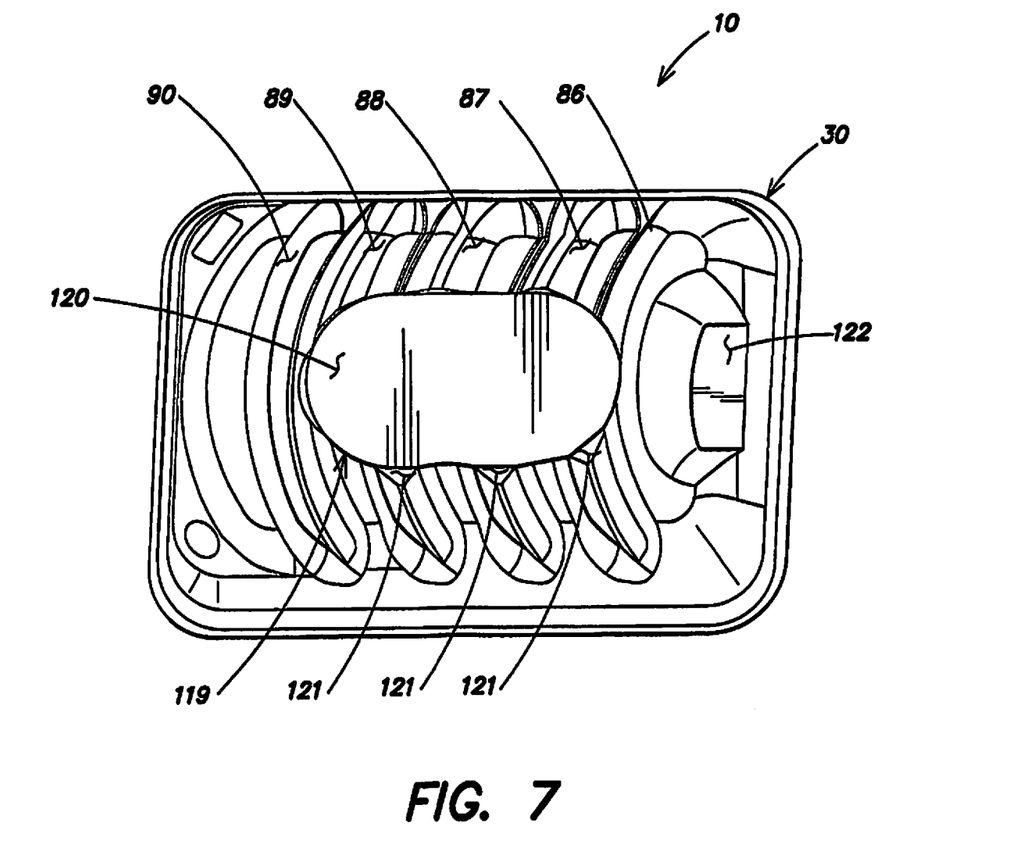
FIG. 7 is a bottom perspective view of the tray of FIG. 1.

In accordance with the present invention, an initially straight (linear) tubular meat product P (having a central longitudinal axis PL) is shaped from a linear condition to the desired curved (arc) configuration (defined by the pockets 76-80) either manually or by mechanical means. When the desired arc is achieved, the curved meat product P is placed in a base pocket 76-80, each pocket having an inner pocket surface 81-85 (FIGS. 1, 3 and 6), and an outer pocket surface 86-90 (FIGS. 3, 5 and 7). Each pocket is a shallow recess of generally circular cross-section (see FIG. 3) for holding a lower portion of the tubular sausage. The recess has opposing top sidewall surfaces 91A, 91B to 95A, 95B (FIGS. 1, 6), equidistant apart along their length, which define the opposing arced edges of the opening to the pocket. The curved pockets are arranged in parallel series between the pocket end walls 18 and 20 (transverse to the tray CL), with the opposing ends of each pocket adjacent the opposing pocket sidewalls 14 and 16. In the present embodiment the pocket is substantially less than hemispherical, e.g., having a depth (D2 in FIG. 3) that is in a range of 15 to 50% of the diameter PD of the tubular meat product P (preferably 30-45% and more preferably 40-45%), for ease of insertion and removal of the meat product from the pocket. Preferably, the pocket cross section widens going toward the top sidewall edges 91-95, again for ease of insertion and removal.

To facilitate loading of the tray with a plurality of curved tubular meat products P, a first end 18 of the tray has a centrally disposed interior pusher rib wall 101 that structurally supports the tray and arced meat configuration of a first product P1 loaded into the first pocket 76 immediately adjacent the first end wall 18. The first product is typically the most difficult to properly align in any processor tray and hold in position while additional products are loaded in the tray. The central pusher wall 101 includes a top wall 102, generally parallel to the BRP, and an arced sidewall 104 that slopes downwardly from edge 103 where it joins the top wall. The arced sidewall 104 extends down toward the BRP, forming a ramp leading into the interior of the first pocket 76 to facilitate loading of the curved first product P1 into first pocket 76. The ramp 104 forms part of the first pocket 76 interior surface 81 and the edge 103 forms the arced top edge 91A of the first pocket 76. On the opposing top edge 91B of the first pocket, a flattened area 106 is provided on edge 91B in order to form a complimentary flat area on the outer surface of the tray adapted for engagement by a suction mechanism (e.g. suction cups) to the outer surface for de-nesting and transport of the tray (e.g. transport of the loaded and wrapped tray). The enlarged centrally disposed flat area 119 on the back (outer or underside) surface of the tray is shown in FIG. 7, and straddles the backs (outer surfaces 86-89) of the first four pockets 76-79. The flat area 119 has a central flat planar wall 120 that lies slightly recessed from and parallel to the BRP, and has supporting ribs 121 on each side that extend into and between the outer surfaces 86-89 of the first four pockets. As previously noted, the BRP (or standing surface of the tray) is formed by the outer surfaces 86-90 of the five pockets The outer (back) surface 122 of the top wall 102 of the central pusher rib, is recessed from the outer surface 86 of the first pocket and provides a flat area for labeling, as well as providing structural support the tray.

To further facilitate product alignment and ease of loading, a pair of end pusher ribs 111A and 111B are provided adjacent the second end wall 20 and corners 26 and 28. This pair of end pusher ribs is configured to structurally support the fifth pocket 85 that lies adjacent the second end wall 20, and are disposed respectively between each end of the curved fifth pocket 80 and the rounded corners 26 and 28. Each end pusher rib has a flat planar top surface (plateau) disposed substantially parallel to the BRP, and lying in the mid reference plane MRP (FIGS. 2-3) that forms the junction of the upper interior cavity 60 and the lower cavity 62 (formed by the pockets 76-80). The combination of the central pusher rib 102 at the first end wall 18, and the pair of corner or end pusher ribs 111A and 111B at the second end wall 20, together provide strength and guidance for aligning and holding the meat products in their respective pockets.

Figure 12:
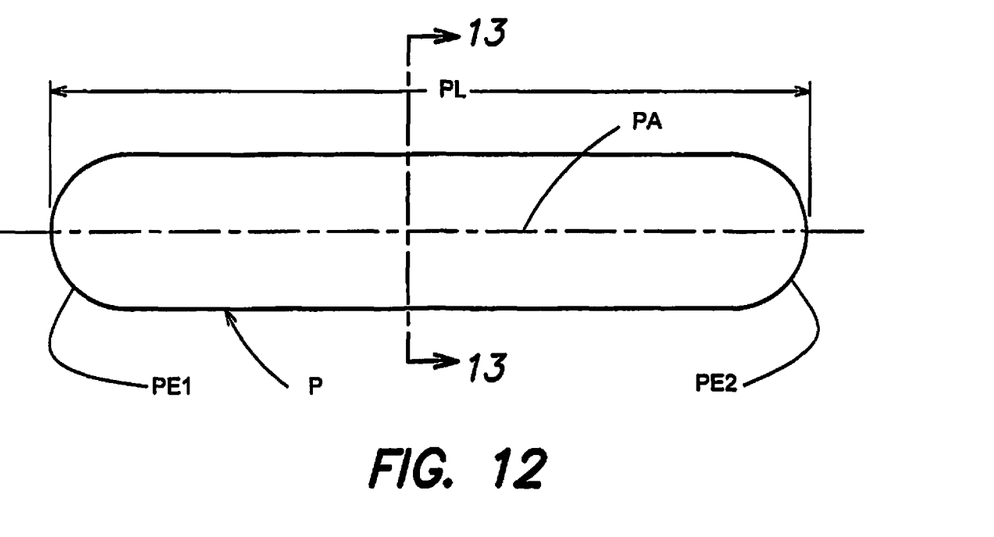
FIG. 12 is a schematic view of one embodiment of a tubular meat product as formed, having a linear configuration and generally rounded ends.

The processor tray of the invention is suitable for use with a variety of tubular meat products including sausage, kielbasa, frankfurters, and other such items which may be processed with skinless or other artificial casings. These types of casings (cellulose, collagen, etc.) generally do not result in a product having a curvature. The meat product P is thus any of the above types of tubular meat products that when formed has a substantially straight shape defined by a longitudinal tubular axis PA, a cross sectional diameter PD, and generally rounded opposing ends PE1 and PE2 (FIGS. 12-13).

Figure 13:
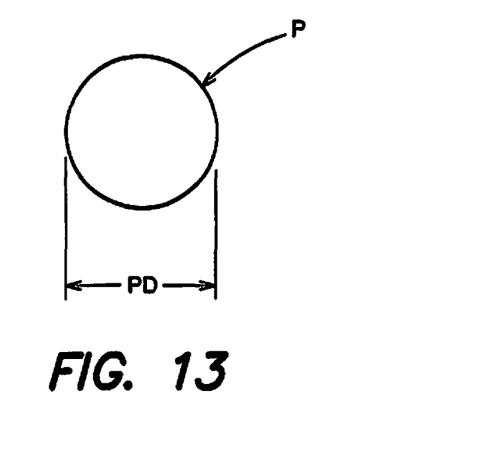
FIG. 13 is a cross sectional view of the tubular meat product of FIG. 12.

The trays comprising the present invention may vary in size for storage and display of tubular meat products that vary in size from, for example ¼ inch to 1¼ inches in product diameter PD (FIG. 13), and from 3-12 inches in linear product length PL (FIG. 13, as manufactured, prior to being curved to fit in the pockets). It is to be realized that the optimum dimensional relationship for the parts of the tray include variations in size, materials, shape, form, function, and manner of operation, assembly and use, and are deemed readily apparent and obvious to one skilled in the art. The present embodiment is intended to be just one example of the invention and not limiting.

Returning to FIGS. 1-4, the inner surfaces 81-85 of the arced pockets 76-80 of the base 12 define a lower cavity 62 for holding the product P. The outer surfaces 81-85 of the pockets of base 12 define a lowermost standing surface 32 that lies in a base reference plane BRP (see FIGS. 2-3). The standing surface 32 is interrupted due to the molded configuration of the arced pockets. The pocket inner surfaces 81-85 provide elongated and arced tubular pocket cavities each having a respective pair of opposing arced top surface edges (91A, 91B to 95A, 95B) that define the open ends of the arced pocket sidewalls, and each pocket having a respective pair of opposing rounded pocket end walls (96A, 96B to 100A, 100B) adapted to receive the rounded ends PE1, PE2 after curvature of the meat product P. The top edges of the sidewalls and end walls of the pockets lie generally in a mid-reference plane MRP that defines a junction 61 between the lower cavity 62 (defined by the pockets of the base 12) and the upper cavity 60 (defined by the longitudinal sidewalls 14, 16, end sidewalls 18, 20, and corners 22-28).

Figure 3A:
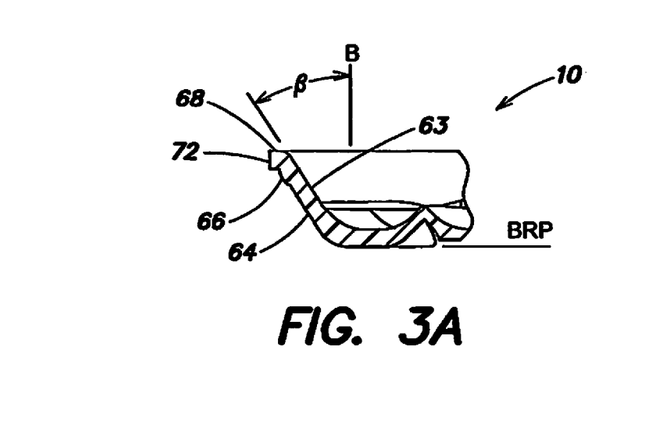
FIG. 3A is a partial cross-sectional view of a corner of the tray of FIG. 1.

The sidewalls and end walls 14-20 of the upper cavity 60 are angularly disposed relative to the base reference plane BRP to define an acute angle α relative to a transverse axis TA which is perpendicular to the BRP (FIG. 3). The angle α is preferably in a range of 15° to 40°. The corners 22-28 are also angularly disposed relative to the BRP. Preferably, each of the corners 22-28 is generated by rotating a plane curve about a central reference axis B which is perpendicular to the BRP (FIG. 3A). The corners 22-28 are preferably formed to define an acute angle beta relative to the reference axis B in the range of 19-45°. The representative corner 28 (FIG. 3A) is formed with an inner surface 63, an outer surface 64, and a top surface 68.

Figure 4:
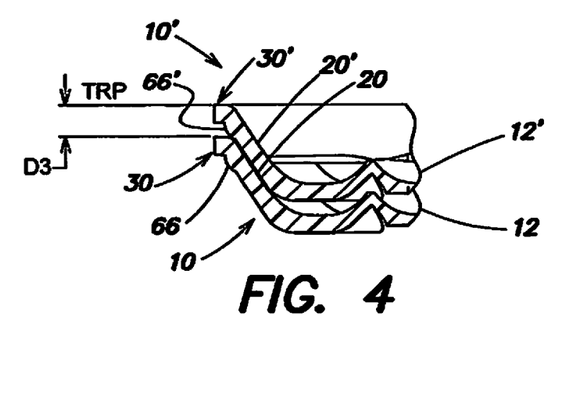
FIG. 4 is a partial cross-sectional view of two empty trays in a stacked (nested) arrangement.

A bead 66 (FIGS. 2-4) may be provided that extends from the outer surfaces 44-50 of the respective sidewalls and the outer surfaces of the respective corners 22-28, typically right below the flange 30. The bead may be continuous or formed with interruptions and may be formed with an arcuate shape as shown. The bead assists in spaced stacking of empty trays, as shown in FIG. 4, wherein the upper surface of the flange 30 of lower tray 10 is spaced a distance D3 from the upper surface of the flange 30' of the upper tray 10'. This spacing facilitates de-nesting of empty stacked trays.

Figure 2:
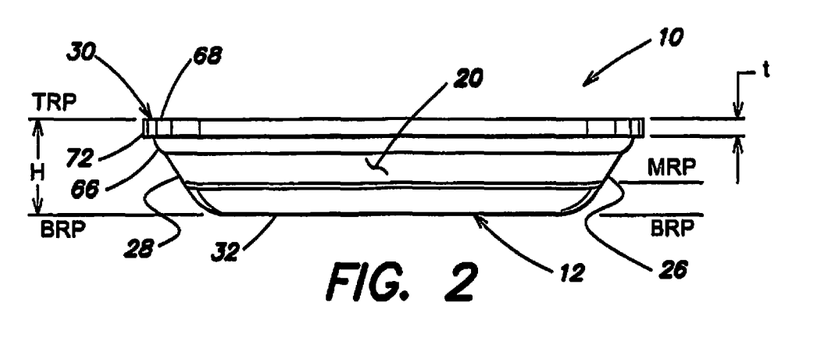
FIG. 2 is an end elevational view of the tray of FIG. 1.

The flange 30 (FIGS. 1-4) forms an uppermost top perimeter surface of the tray and extends transversely from the outer surfaces of the sidewalls and end walls 14-20 and the outer surfaces of the corners 22-28. Preferably, the flange extends continuously about the top perimeter of the tray. The flange 30 has an upper surface 68 and a base surface 70, each generally parallel to the BRP, and an edge surface 72, generally transverse to the BRP, extending between the upper and base surfaces. As can be seen in FIGS. 1-2, the edge surface 72 defines the thickness t of the flange and the overall rectangular shape (perimeter) of the tray 10.

The flange 30 in the present embodiment lies in a top reference plane (TRP) substantially parallel to the base reference plane (BRP). In other embodiments, the flange may be inclined upwardly or downwardly with respect to the BRP. In the present embodiment, the flange 30 is formed with the edge surface 72 being planar, so as to evenly distribute the tension in the plastic film wrapped around the loaded tray.

Figure 10:
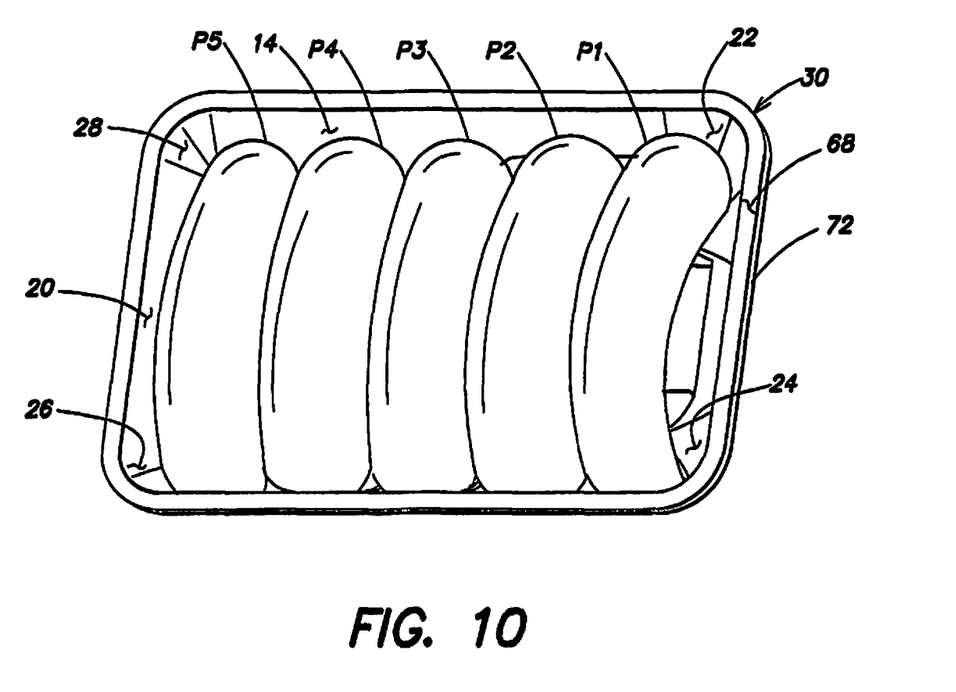
FIG. 10 is a top perspective view of the loaded tray of FIG. 8.
Figure 11:
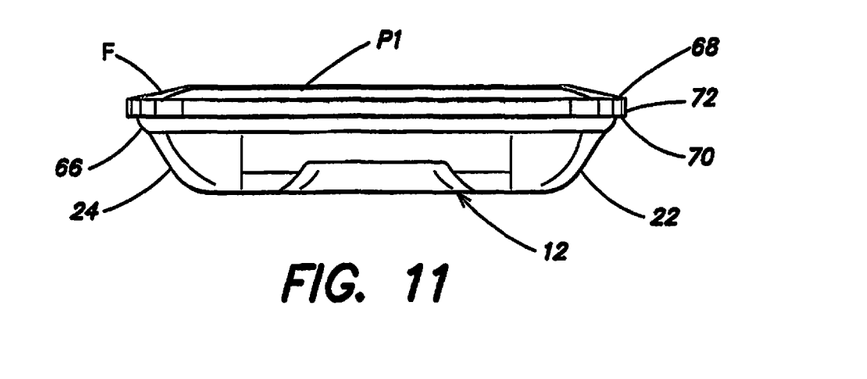
FIG. 11 is an end elevational view of the loaded and wrapped tray of FIG. 9.

Referring to FIGS. 8-11, there is shown a tray 10 loaded with packaged tubular meat products P and tightly wrapped plastic film F (shown to be transparent). The wrapping film may somewhat deflect the flange 30 from its original molded shape. With the plastic film F being maintained in a taut state, the trays of the present invention can be loaded, wrapped and stacked in a master container for shipment. With two of the trays being stacked, the flanges along the sidewalls and end walls apply force to the film F to maintain tautness. With the upper tray resting on the plastic film F of the lower tray, the plastic film F deflects downwardly with the bottom of the upper tray being below the top surface of the flange of the lower tray. Although the plastic F may stretch slightly, the plastic film F remains taut and does not become loosened about the tray. The same result is achieved even where the packaged goods P extend above the tray as shown in FIGS. 9-11.

As is readily apparent, numerous modifications and changes may readily occur to the skilled person in the art, and hence it is not desired to limit the invention to the exact construction and operation as shown and described. All suitable modifications and equivalents may be considered to fall within the scope of the invention as claimed.

What is claimed is:

1. A packing tray for elongated tubular meat products, the packing tray comprising:
    a plastic foam tray having topside and underside surfaces, the underside surface including a lowermost standing surface of the tray lying in a base reference plane (BRP);
    the tray having a top flange with a rectangular perimeter lying in a top reference plane (TRP) parallel to the base reference plane (BRP), the top flange rectangular perimeter comprising opposing first and second longitudinal edges aligned parallel to a central longitudinal tray axis (CL) and opposing first and second lateral edges transverse to the central longitudinal tray axis (CL);
    the tray topside surface having a cavity wall depending downwardly from the top flange to define an upper interior cavity, and the tray topside surface further including a lower cavity comprising a plurality of longitudinally aligned curved pockets recessed below the upper interior cavity; and
    each curved pocket having, in a pocket length direction extending between opposing ends of the pocket, a pair of elongated arc shaped opposing top edges spaced equidistant apart and configured to shape an elongated tubular meat product into an arced configuration in the curved pocket and a first pocket of the plurality of longitudinally aligned curved pockets is proximally disposed toward the first lateral edge and longitudinally aligned and traverse to the central longitudinal axis (CL),
    wherein the tray further comprises:
        a central pusher wall, centrally disposed adjacent the first pocket of the curved pockets and toward the first lateral edge and forming a portion of the curve of the first pocket, comprising a top wall lying in the upper interior cavity above the first pocket and an arced sidewall that slopes downwardly from the top wall forming a ramp leading into the interior of the first pocket to facilitate product alignment and loading of a first elongated tubular meat product into the first pocket, the top wall lies in a mid-reference plane (MRP) between the top reference plane (TRP) and the base reference plane (BRP), and the ramp lies at an acute angle with respect to the base reference plane (BRP), and
        a pair of end pusher ribs lying in the upper interior cavity and disposed adjacent each end of a second one of the curved pockets, and disposed proximate the second lateral edge,
    wherein the combination of the central pusher wall adjacent the first pocket and the pair of end pusher ribs adjacent the second pocket together provide strength and guidance for aligning and holding the meat products in their respective pockets of the tray.

2. The tray of claim 1, wherein:
    each elongated arc shaped top edge has an apex located halfway along the length direction of the pocket.

3. The tray of claim 2, wherein:
    the apex is located on the central longitudinal axis (CL).

4. The tray of claim 1, wherein the cavity wall depends downwardly from the top reference plane (TRP) at an acute angle.

5. The tray of claim 1, wherein each pocket further comprises opposed quarter-spherical first and second ends.

6. The tray of claim 1, further including:
    a formed flat area comprising a planar surface aligned parallel to the top reference plane (TRP), the surface comprising a portion of the tray underside surface;
    the formed flat area recessed below the lowermost standing surface of the tray;
    and a plurality of longitudinally aligned recessed nesting segments configured to accommodate the formed flat area of a second tray nested within the first tray.

7. A stack of trays according to claim 1, the stack comprising:
    a first tray and one or more nested trays;
    a second tray nested within the first tray;
    wherein the topside surface of the first tray engages the underside surface of the second tray, and each remaining tray in the stack likewise engaged a preceding tray.

8. The tray of claim 1, wherein the plastic material comprises one or more of polystyrene (EPS), polyester, polyolefin, polypropylene (PP), or polylactic acid (PLA), including homopolymers, copolymers, mixtures and blends thereof, and including virgin and reclaimed/recycled materials.

9. The tray of claim 8, wherein the plastic foam tray comprises polystyrene foam.

10. The tray of claim 1, wherein each pocket has a depth extending below the upper cavity of 15 to 50% of a diameter (PD) of the meat product.

11. The tray of claim 10, wherein the depth is 30 to 45%.

12. The tray of claim 10, wherein the depth is 40 to 45%.

13. The tray of claim 3, wherein the arced configuration is defined as an angle between two intersecting straight lines L1, L2 that pass respectively through centers C1, C2 of the opposing ends of the arced pocket and cross at CL, and wherein the angle ranges from 5 to 50 degrees.

14. The tray of claim 13, wherein the angle ranges from 10 to 30 degrees.

15. The tray of claim 13, wherein the angle ranges from 10 to 20 degrees.

16. The tray of claim 1 further comprising curved elongated tubular meat products disposed in the curved pockets and an overwrap film wrapped around the tray and the curved elongated tubular meat products.

17. A method of packing elongated tubular meat products in a packing tray, as recited in claim 6, for display and storage, the method comprising:

providing a plurality of straight elongated tubular sausage products;

providing the tray of claim 6;

depositing each of the straight elongated tubular sausage products into one of the curved pockets by shaping the sausage product to conform to the curved shape of the pocket, a lower portion of each sausage product being deposited in the respective pocket and an upper portion of each of the sausage products extending into the upper interior cavity and at or above the top reference plane (TRP);

providing a sheet of wrapping film and positioning it over the tray and the sausage products deposited therein;

pulling the sheet taut to engage the surface of each sausage product deposited within the tray and the tray perimeter; and securing the sheet to the tray.

\* \* \* \* \*

UNITED STATES PATENT AND TRADEMARK OFFICE
CERTIFICATE OF CORRECTION

PATENT NO.         : 10,421,601 B2
APPLICATION NO.    : 15/417520
DATED              : September 24, 2019
INVENTOR(S)        : Mark Bergeron and Babu Kuruvilla Page 1 of 1

It is certified that error appears in the above-identified patent and that said Letters Patent is hereby corrected as shown below:

In the Claims
Column 10, Line 66 (Claim 17, Line 2) change "claim 6" to --claim 1--.

Signed and Sealed this
Fifth Day of November, 2019

Andrei Iancu
*Director of the United States Patent and Trademark Office*